US010867159B2

(12) United States Patent
Setlak et al.

(10) Patent No.: US 10,867,159 B2
(45) Date of Patent: Dec. 15, 2020

(54) ELECTRONIC DEVICE INCLUDING PALM BIOMETRIC SENSOR LAYER AND RELATED METHODS

(71) Applicant: Apple Inc., Cupertino, CA (US)

(72) Inventors: Dale R. Setlak, Merritt Island, FL (US); Giovanni Gozzini, Berkeley, CA (US); Mohammad Yeke Yazdandoost, San Jose, CA (US)

(73) Assignee: APPLE INC., Cupertino, CA (US)

(*) Notice: Subject to any disclaimer, the term of this patent is extended or adjusted under 35 U.S.C. 154(b) by 62 days.

(21) Appl. No.: 16/262,032

(22) Filed: Jan. 30, 2019

(65) Prior Publication Data

US 2019/0278973 A1 Sep. 12, 2019

Related U.S. Application Data

(60) Provisional application No. 62/640,917, filed on Mar. 9, 2018.

(51) Int. Cl.
*G06K 9/00* (2006.01)
*G06K 9/22* (2006.01)
*G06K 9/32* (2006.01)

(52) U.S. Cl.
CPC ....... *G06K 9/00087* (2013.01); *G06K 9/0004* (2013.01); *G06K 9/00033* (2013.01);
(Continued)

(58) Field of Classification Search
CPC .. G06K 9/00087; G06K 9/00067; G06K 9/22; G06K 9/3275; G06K 9/00033; G06K 9/0004; G06K 2009/00932; G06F 21/32
See application file for complete search history.

(56) References Cited

U.S. PATENT DOCUMENTS 6,795,569 B1 * 9/2004 Setlak ................ G06K 9/00006
382/124
9,792,512 B2 10/2017 Matsunami
(Continued)

FOREIGN PATENT DOCUMENTS

EP 2477155 7/2012
EP 3073414 9/2016

OTHER PUBLICATIONS

Zhou et al.; "Contactless Palm Vein Identification using Multiple Representations;" Department of Computing, The Hong Kong Polytechnic University, Hung Horn, Kowloon, Hong Kong; 2009-2010; pp. 1-6.
(Continued)

*Primary Examiner* — Siamak Harandi
(74) *Attorney, Agent, or Firm* — Allen, Dyer, Doppelt + Gilchrist, P.A.

(57) ABSTRACT

An electronic device may include a display layer including light transmissive portions and non-transmissive portions. The electronic device may also include a palm biometric image sensor layer beneath the display layer and configured to sense an image of a user's palm positioned above the display layer based upon light reflected from the user's palm passing through the light transmissive portions of the display layer. The electronic device may further include a controller configured to capture image data from the user's palm in cooperation with the palm biometric image sensor layer and determine a surface distortion of the user's palm based upon the image data. The controller may also be configured to perform a biometric authentication of the user's palm based upon the image data and the surface distortion.

18 Claims, 14 Drawing Sheets

(52) U.S. Cl.
CPC ........... *G06K 9/00067* (2013.01); *G06K 9/22* (2013.01); *G06K 9/3275* (2013.01); *G06K 2009/00932* (2013.01)

(56) References Cited

U.S. PATENT DOCUMENTS

| | | |
|---|---|---|
| 9,792,515 B2 | 10/2017 | Matsunami |
| 10,135,822 B2 | 11/2018 | Adams |
| 10,586,092 B2* | 3/2020 | Hong ................. G06K 9/00013 |
| 2005/0148876 A1 | 7/2005 | Endoh et al. |
| 2010/0080422 A1 | 4/2010 | Sato |
| 2013/0127980 A1* | 5/2013 | Haddick ............ G02B 27/0093 348/14.08 |
| 2015/0347833 A1 | 12/2015 | Robinson et al. |
| 2017/0262693 A1 | 9/2017 | Aoki |
| 2018/0005005 A1 | 1/2018 | He et al. |
| 2018/0150712 A1* | 5/2018 | Aoki ....................... G06K 9/42 |
| 2018/0225498 A1* | 8/2018 | Setlak ................ G06K 9/00026 |

OTHER PUBLICATIONS

Fujitsu Computer Products of America, Inc.; "Palm Vein Pattern Authentication Technology;" Whitepaper; 2006; pp. 1-12.

* cited by examiner

CONTROLLER _22_

- DETECT THE USER'S PALM BEING POSITIONED ADJACENT THE CONTACTLESS PALM BIOMETRIC SENSOR

- CAPTURE IMAGE DATA FROM A USER'S PALM POSITIONED IN SPACED RELATION ADJACENT THE CONTACTLESS PALM BIOMETRIC SENSOR (E.G., BASED UPON DETECTING THE USER'S PALM BEING POSITIONED ADJACENT THE CONTACTLESS PALM BIOMETRIC SENSOR)

- PROJECT DOT IMAGES ONTO THE SURFACE OF THE USER'S PALM

- DETERMINE AN ORIENTATION OFFSET OF THE USER'S PALM (E.G., YAW OFFSET, PITCH OFFSET, X-OFFSET, Y-OFFSET, AND Z-OFFSET FROM A CORRESPONDING ONE OF A YAW REFERENCE, PITCH REFERENCE, X REFERENCE, Y REFERENCE, AND Z REFERENCE) BASED UPON THE IMAGE DATA (E.G., BASED UPON IMAGE DATA RESULTING FROM DOT IMAGES PROJECTED ON THE SURFACE OF THE USER'S PALM FROM A DOT IMAGE PROJECTOR)

- DETERMINE A SURFACE DISTORTION OF THE USER'S PALM BASED UPON THE IMAGE DATA (E.G., PALM CREASE DATA RESULTING FROM THE FLOOD LIGHT SOURCE), BASED UPON COMPARING THE PALM CREASE DATA TO STORED PALM CREASE DATA

- DETERMINE PALM VEIN DATA FROM THE IMAGE DATA RESULTING FROM THE IR LIGHT SOURCE

- PERFORM A BIOMETRIC AUTHENTICATION OF THE USER'S PALM BASED UPON THE IMAGE DATA, THE ORIENTATION OFFSET, AND THE SURFACE DISTORTION (E.G., BASED UPON A COMPARISON BETWEEN DETERMINED PALM VEIN DATA AND STORED PALM VEIN DATA)

- ACCEPT A GESTURE INPUT BASED UPON GESTURE MOVEMENT OF THE USER'S PALM ADJACENT THE CONTACTLESS BIOMETRIC PALM SENSOR

- PERFORM FACIAL RECOGNITION IN COOPERATION WITH ONE OF THE LIGHT SOURCES AND AT LEAST ONE LIGHT SENSOR

FIG. 4

22' CONTROLLER

- DETECT THE USER'S PALM BEING POSITIONED ADJACENT THE PALM BIOMETRIC IMAGE SENSOR

- CAPTURE IMAGE DATA FROM A USER'S PALM IN COOPERATION WITH THE PALM BIOMETRIC IMAGE SENSOR LAYER (E.G., BASED UPON DETECTING THE USER'S PALM BEING POSITIONED ADJACENT THE PALM BIOMETRIC IMAGE SENSOR)

- DETERMINE A SURFACE DISTORTION OF THE USER'S PALM BASED UPON THE IMAGE DATA (E.G., PALM CREASE DATA RESULTING FROM THE FLOOD LIGHT SOURCE AND COMPARED TO STORED PALM CREASE DATA)

- DETERMINE PALM VEIN DATA FROM THE IMAGE DATA RESULTING FROM THE IR LIGHT SOURCE

- PERFORM A BIOMETRIC AUTHETICATION OF THE USER'S PALM BASED UPON THE IMAGE DATA AND THE SURFACE DISTORTION (E.G., BASED UPON A COMPARISON BETWEEN DETERMINED PALM VEIN DATA AND STORED PSLM VEIN DATA)

FIG. 13

ELECTRONIC DEVICE INCLUDING PALM BIOMETRIC SENSOR LAYER AND RELATED METHODS

RELATED APPLICATION

The present application claims the priority benefit of provisional application Ser. No. 62/640,917 filed on Mar. 9, 2018, the entire contents of which are herein incorporated by reference.

TECHNICAL FIELD

The present invention relates to the field of electronics, and, more particularly, to the field of light based image sensors and related methods.

BACKGROUND

Biometric sensing and matching is a reliable and widely used technique for personal identification or verification. In particular, a common approach to biometric identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A biometric sensor may be particularly advantageous for verification and/or authentication in an electronic device, and more particularly, a portable device, for example. Such a biometric sensor may be carried by the body of a portable electronic device, for example, and may be sized to sense a biometric, for example, a fingerprint from a single-finger. Where a biometric sensor is integrated into an electronic device or host device, for example, as noted above, it may be desirable to perform authentication, particularly while performing another task or an application on the electronic device.

SUMMARY

An electronic device may include a display layer including light transmissive portions and non-transmissive portions. The electronic device may also include a palm biometric image sensor layer beneath the display layer and configured to sense an image of a user's palm positioned above the display layer based upon light reflected from the user's palm passing through the light transmissive portions of the display layer. The electronic device may further include a controller configured to capture image data from the user's palm in cooperation with the palm biometric image sensor layer and determine a surface distortion of the user's palm based upon the image data. The controller may also be configured to perform a biometric authentication of the user's palm based upon the image data and the surface distortion.

The palm biometric image sensing layer may include a substrate, a photodiode layer on the substrate, and a narrowing field of view layer above the photodiode layer, for example. The palm biometric image sensing layer may include a substrate, a photodiode layer on the substrate, and a focusing layer above the photodiode layer, for example.

The electronic device may further include an infrared light source, and the controller may be configured to determine palm vein data from the image data resulting from the infrared light source. The controller may be configured to perform the biometric authentication based upon comparing palm vein data to stored palm vein data, for example.

The electronic device may include a flood light source, and the controller may be configured to determine palm crease data from the image data resulting from the flood light source. The controller may be configured to determine the surface distortion based upon comparing the palm crease data to stored palm crease data, for example. The flood light source may include a flood light source operable at a wavelength between 450 nm to 560 nm, for example.

The controller may be configured to detect the user's palm being positioned adjacent the palm biometric image sensor layer and capture the image data based upon thereon. The electronic device may further include a portable housing carrying the display layer, palm biometric image sensor layer, and controller, and a wireless transceiver carried by the portable housing and coupled to the controller, for example. The electronic device may further include a watchband carried by the portable housing, for example. The controller may include a processor and a memory coupled thereto.

A method aspect is directed to a method of biometric authentication using a palm biometric image sensor layer adjacent a display layer and configured to sense an image of a user's palm positioned above the display layer based upon light reflected from the user's palm passing through the display layer. The method may include using a controller coupled to the palm biometric image sensor layer to capture image data from the user's palm and determine a surface distortion of the user's palm based upon the image data. The method may also include using the controller to perform a biometric authentication of the user's palm based upon the image data and the surface distortion.

BRIEF DESCRIPTION OF THE DRAWINGS

FIG. 4 is a more detailed schematic block diagram of the controller of FIG. 3.

FIG. 13 is a more detailed schematic block diagram of the controller of FIG. 12.

DETAILED DESCRIPTION

Figure 1:
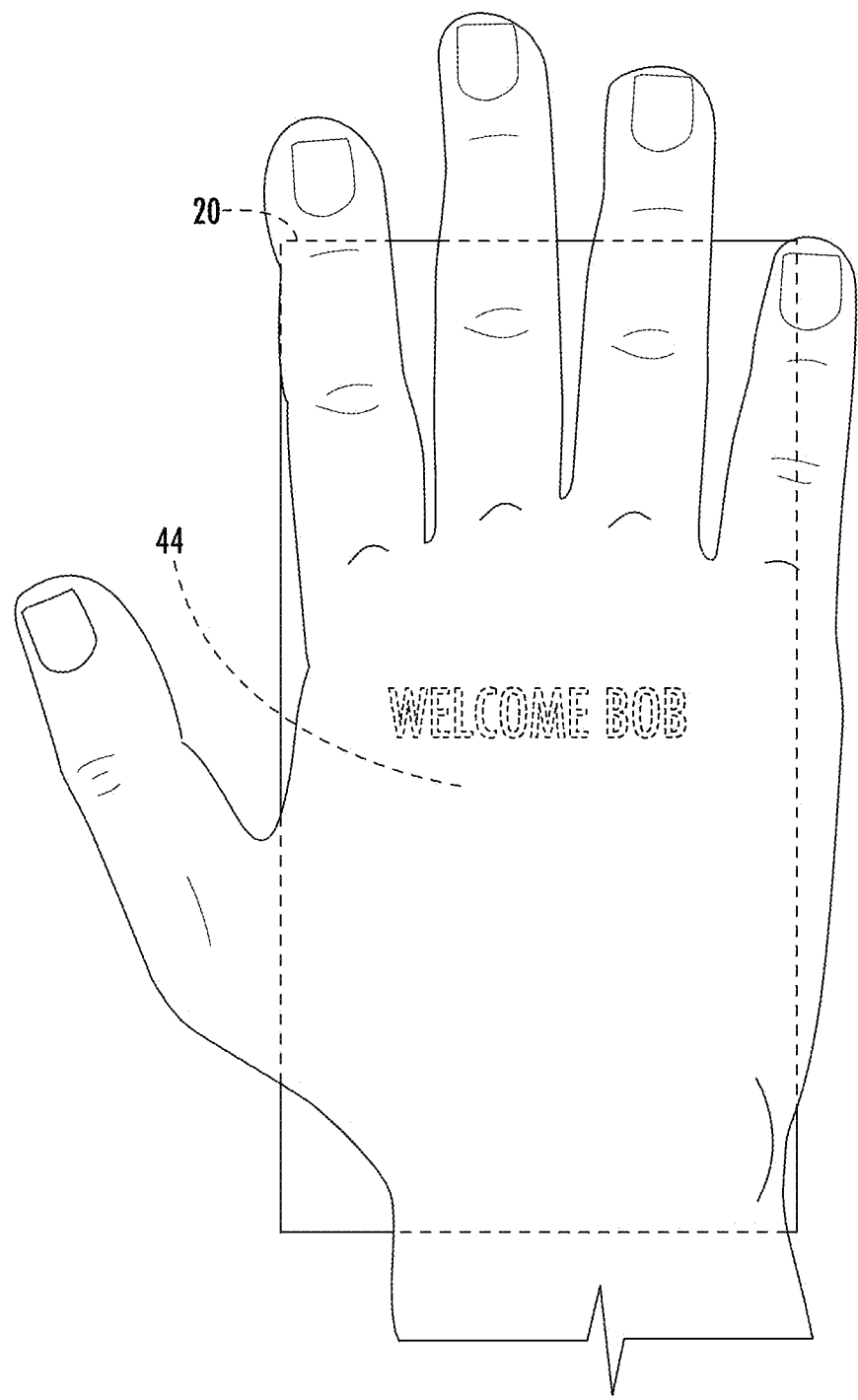
FIG. 1 is a schematic diagram of an electronic device according to an embodiment.
Figure 2:
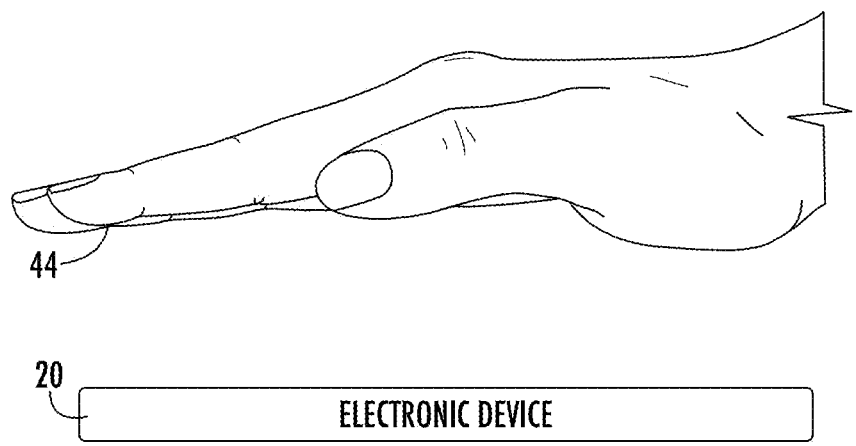
FIG. 2 is another schematic diagram of the electronic device according to an embodiment of FIG. 1.
Figure 3:
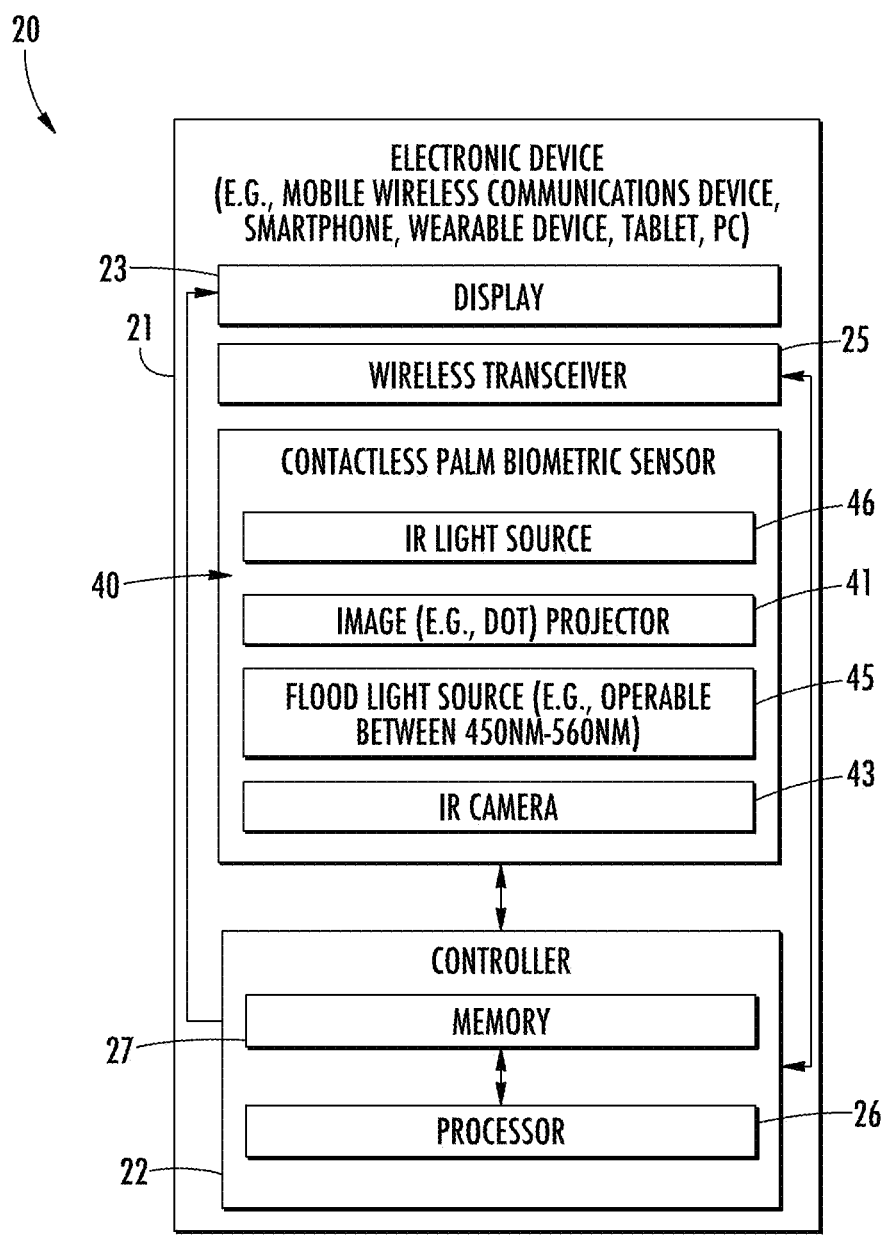
FIG. 3 is a schematic block diagram of the electronic device of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 1-4, an electronic device 20 illustratively includes a portable housing 21 and a controller 22 carried by the portable housing. The electronic device 20 is illustratively a mobile wireless communications device, for example, a mobile telephone or smartphone. The electronic device 20 may be another type of electronic device, for example, a wearable electronic device, a tablet computer, a laptop computer, etc.

The controller 22 may be in the form of a processor 26 and a memory 27 coupled to the processor. The controller 22 may include other and/or additional circuitry, as will be appreciated by those skilled in the art.

A wireless transceiver 25 (e.g. cellular, WLAN Bluetooth, etc.) is also carried within the portable housing 21 and coupled to the controller 22. The wireless transceiver 25 cooperates with the controller 22 to perform at least one wireless communications function, for example, for voice and/or data. In some embodiments, the electronic device 20 may not include a wireless transceiver 25.

A display 23 is also carried by the device housing 21 and is coupled to the controller 22. The display 23 may be, for example, a liquid crystal display (LCD), light emitting diode (LED) display, or may be another type of display, as will be appreciated by those skilled in the art. The display 23 may be a touch display.

Figure 5:
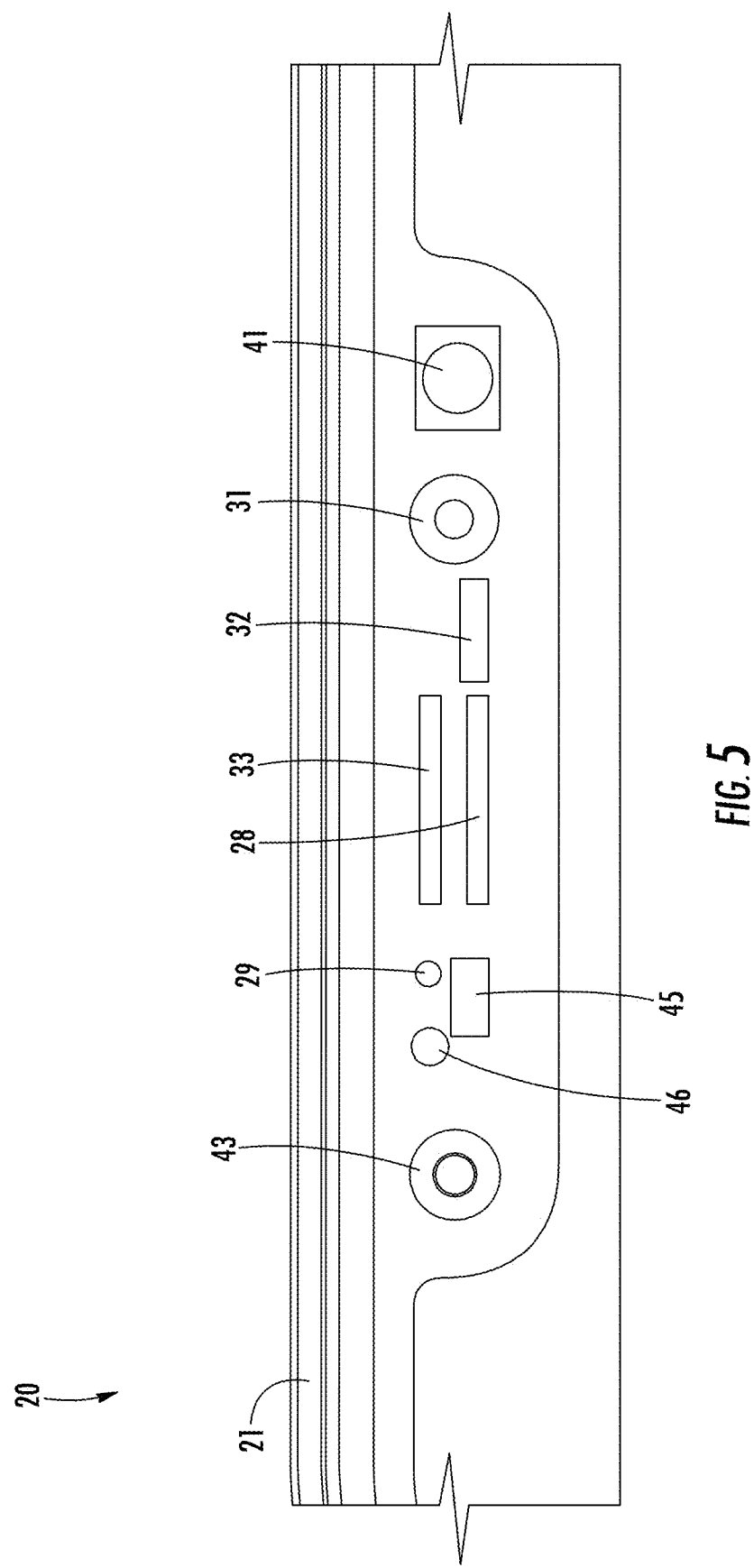
FIG. 5 is a schematic diagram of a portion of the electronic device of FIG. 1

Referring additionally to FIG. 5, the electronic device 20 also includes an audio output transducer 28 (i.e., speaker) carried by the portable housing 21 and coupled to the controller 22. A proximity sensor 29, a front-facing camera 31 (e.g., a "selfie-camera"), an audio input transducer 32, and an ambient light sensor 33 (e.g., for adjusting brightness of the display 23) are also carried by the portable housing 21 and coupled to the controller 22.

Figure 6:
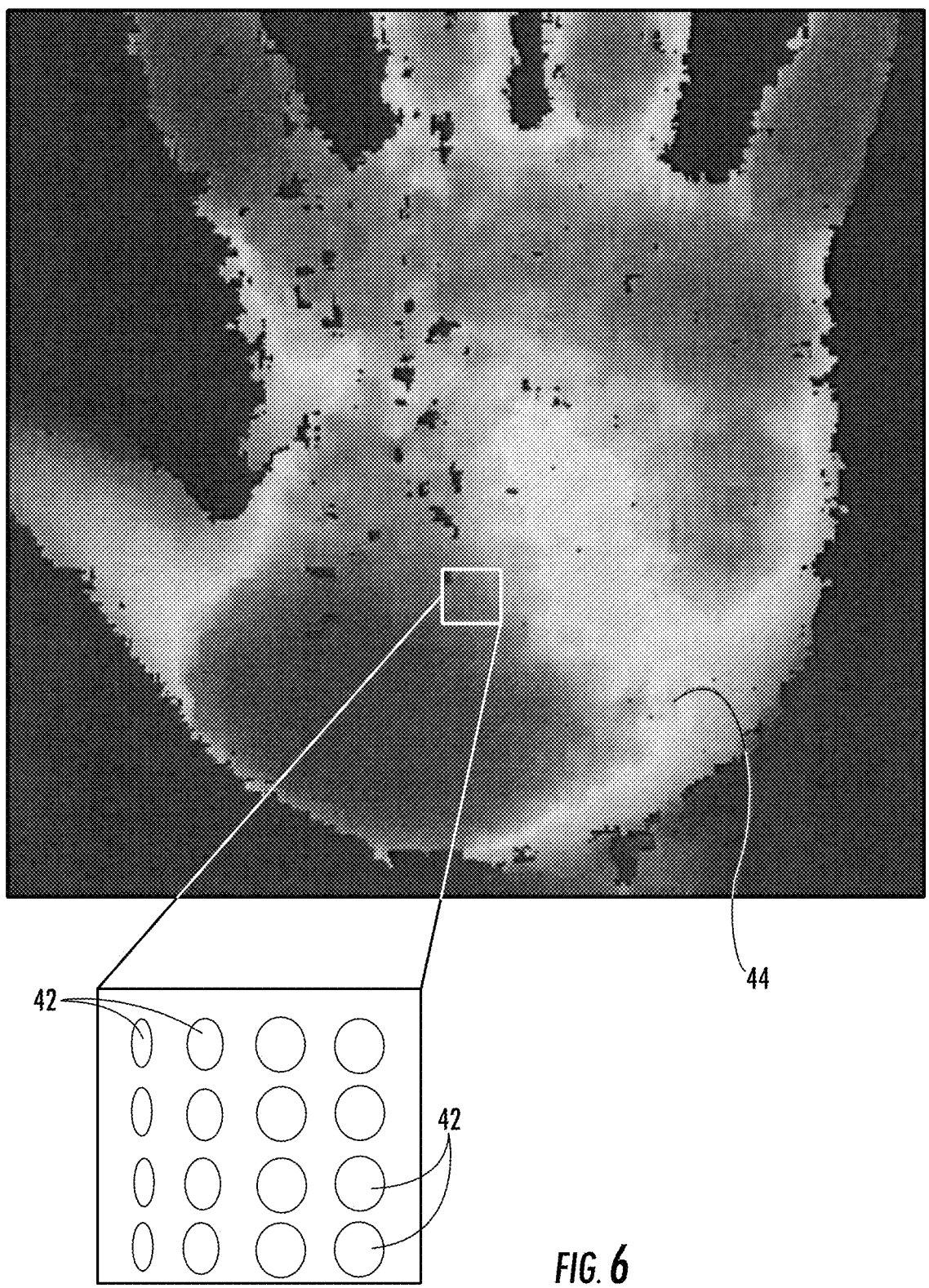
FIG. 6 is an image diagram of a user's palm acquired using an electronic device according to an embodiment.
Figure 7:
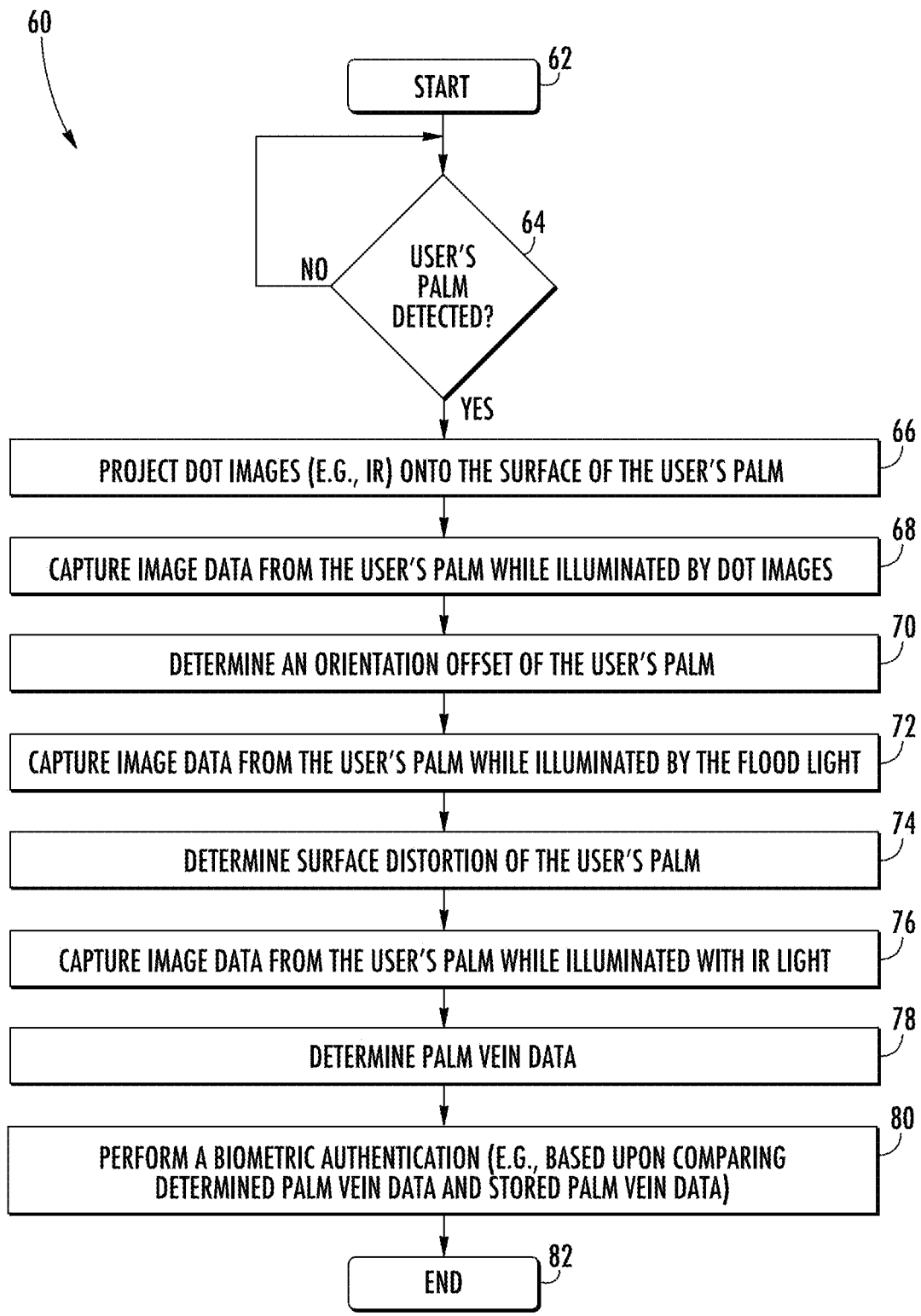
FIG. 7 is a flow diagram according to an embodiment.

Referring now additionally to FIG. 6 and the flowchart 60 in FIG. 7, beginning at Block 62, operation of the controller 22 with respect to sensing of a palm biometric using a contactless palm biometric sensor 40 carried by the portable housing 21 will now be described. The controller 22, at Block 64, may detect the user's palm 44 being positioned adjacent the contactless palm biometric sensor 40, for example, based upon the proximity sensor 29. The controller 22 may capture and process palm image data as described below based upon the detection of the user's palm 44 adjacent the contactless palm biometric sensor 40. Other and/or additional sensors (e.g., a camera) may be used to detect the user's palm 44. If the user's palm 44 is not detected, the controller 22 may poll for detection of the user's palm.

The contactless palm biometric sensor 40 includes an image projector, and more particularly, for example, a dot projector 41. The dot projector 41, based upon detection of the user's palm adjacent the contactless palm biometric sensor 40, projects dot images 42, for example, infrared (IR) dot images, onto the surface of the user's palm 44 (FIG. 6) (Block 66). A light sensor, for example, an IR camera 43 cooperates with the dot projector 41 to acquire image data (e.g., one or more images or video frames) of the user's palm 44 illuminated with the dot images 42 while the user's palm is positioned in spaced relation adjacent the contactless palm biometric sensor 40 (e.g., within a field of view or sensing region of the contactless biometric sensor) (Block 68). There may be more than one IR camera 43. The controller 22 determines the orientation offset of the user's palm 44 based upon the sensed or resulting image data acquired from the IR camera 43 (Block 70). More particularly, the orientation offset may include any one or more of yaw offset, pitch offset, roll offset, X-offset, Y-offset, and Z-offset from a corresponding yaw reference, pitch reference, roll reference, X reference, Y reference, and Z reference. The image in FIG. 6 illustrates an exemplary image of the user's palm 44 and shows the relative orientation offset.

The contactless palm biometric sensor 40 also includes a flood light source 45 carried by the portable housing 21. The flood light source 45 or flood illuminator may include a visible flood light illuminator, for example, and operate in a wavelength between 450 nm and 560 nm (i.e., visible blue-green). In some embodiments, the flood light source 45 may alternatively or additionally include an IR flood light source. Moreover, in some embodiments, the display 23 may alternatively or additionally define the flood light source or an additional flood light source, and may selectively operate pixels. Where the flood light source 45 includes an IR flood light source, the IR flood light source may cooperate with the dot projector 41 and IR camera 43 for further illumination, for example, during determination of the orientation offset of the user's palm 44. Of course, the flood light source 45 may be used along with other light sources and sensors for use in performing other functions, for example, as described herein.

The IR camera 43 cooperates with the flood light source 45 to capture image data of the user's palm 44 illuminated by the flood light source 45 while the user's palm is positioned in spaced relation adjacent the contactless palm biometric sensor 40 (Block 72). The controller 22, at Block 74, determines a surface distortion, for example, palm crease data, of the user's palm 44 based upon the image data. More particularly, the controller 22 determines the surface distortion based upon a comparison between the palm crease data to stored palm crease data, for example, stored in the memory 27. Of course, one or more other or additional light sensors may be used to capture the image data of the user's palm 44 illuminated by the flood light source 45.

Figure 8:
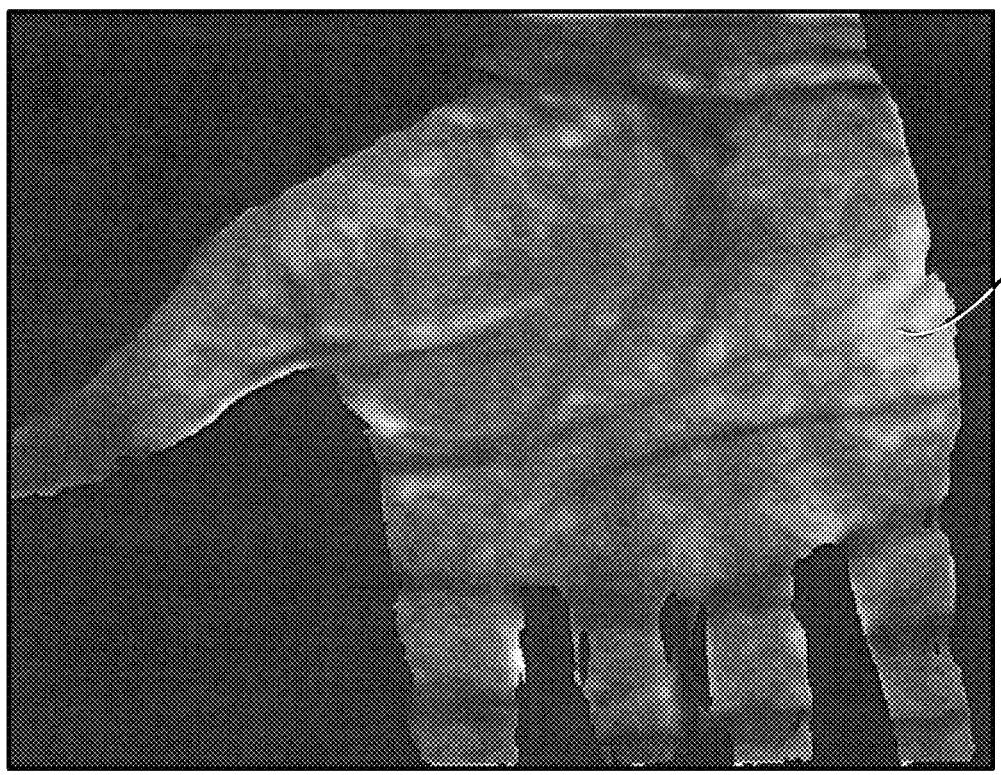
FIG. 8 is an image diagram of a user's palm acquired using an electronic device according to an embodiment.

As will be appreciated by those skilled in the art, skin surface cracks in the user's palm 44 are the dominant features in images of the user's palm taken using visible wavelengths in the blue and green range. For example, the image in FIG. 8 illustrates dominant skin surface cracks in a user's palm 44 illuminated with blue light (i.e., 471 nm). The crack patterns, for example, can be extracted from these images, and normalized based upon the above described distortion estimate.

At Block 80, the controller 22 performs a biometric authentication of the user's palm 44 based upon the image data, the orientation offset, and the surface distortion. More particularly, an IR light source 46 may be selectively operated and cooperate with the IR camera 43 to acquire image data of the user's palm 44 illuminated with the IR light source 46 while the user's palm is positioned in spaced relation adjacent the contactless palm biometric sensor 40 (Block 76). In some embodiments, the flood light source 45 may be used to illuminate the user's palm 44 and/or another or additional IR camera may be used to acquire the image data of the user's palm. The controller 22 may determine, at Block 78, palm vein data from the image data acquired or resulting from the IR light source 46. Of course, other and/or additional IR light sources and IR cameras or sensors may cooperate and be used as a basis for determining the palm vein data. The controller 22, at Block 80, may perform the biometric authentication based upon a comparison between the determined palm vein data and stored palm vein data, for example, stored in the memory 27. In some embodiments, the result of the biometric authentication may result in either a non-match determination or a match similarity score and a detailed distortion correction map that generated the match similarity score. Of course, one or more other or additional light sensors may be used to capture the image data of the user's palm 44 illuminated by the IR source 46.

Figure 9:
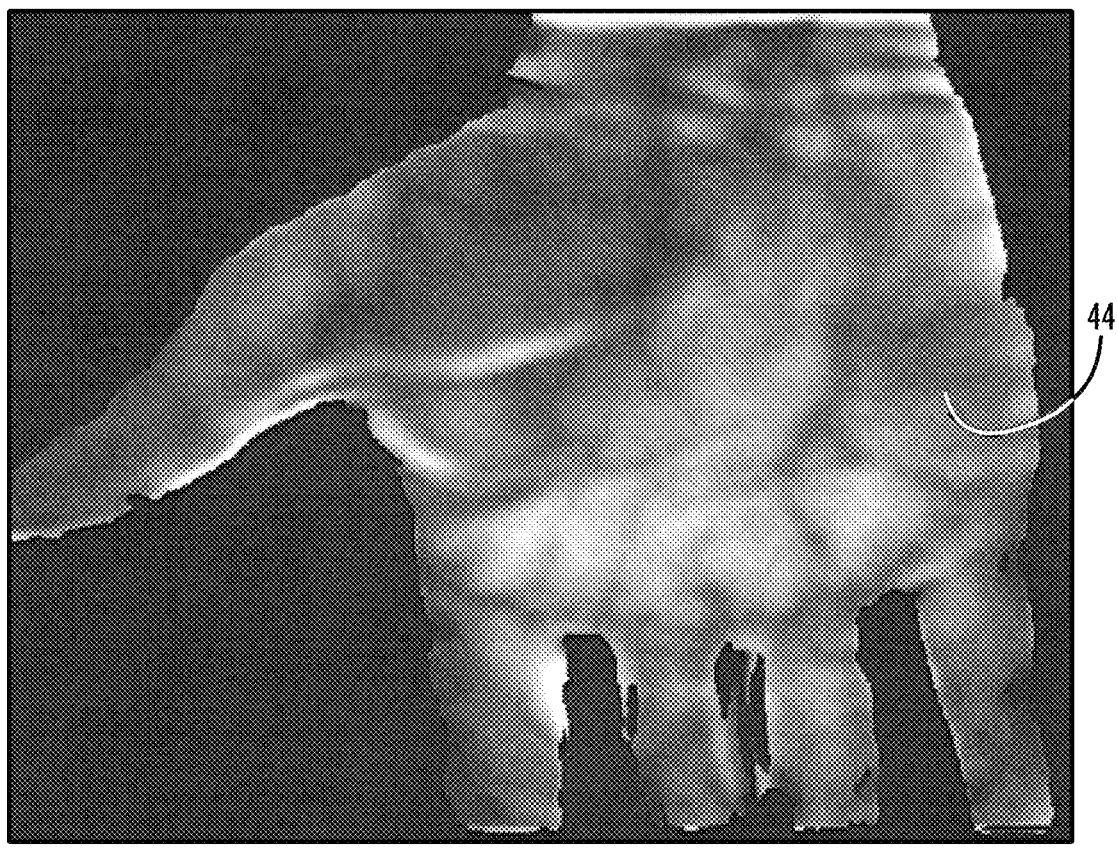
FIG. 9 is another image diagram of a user's palm acquired using an electronic device according to an embodiment.
Figure 10:
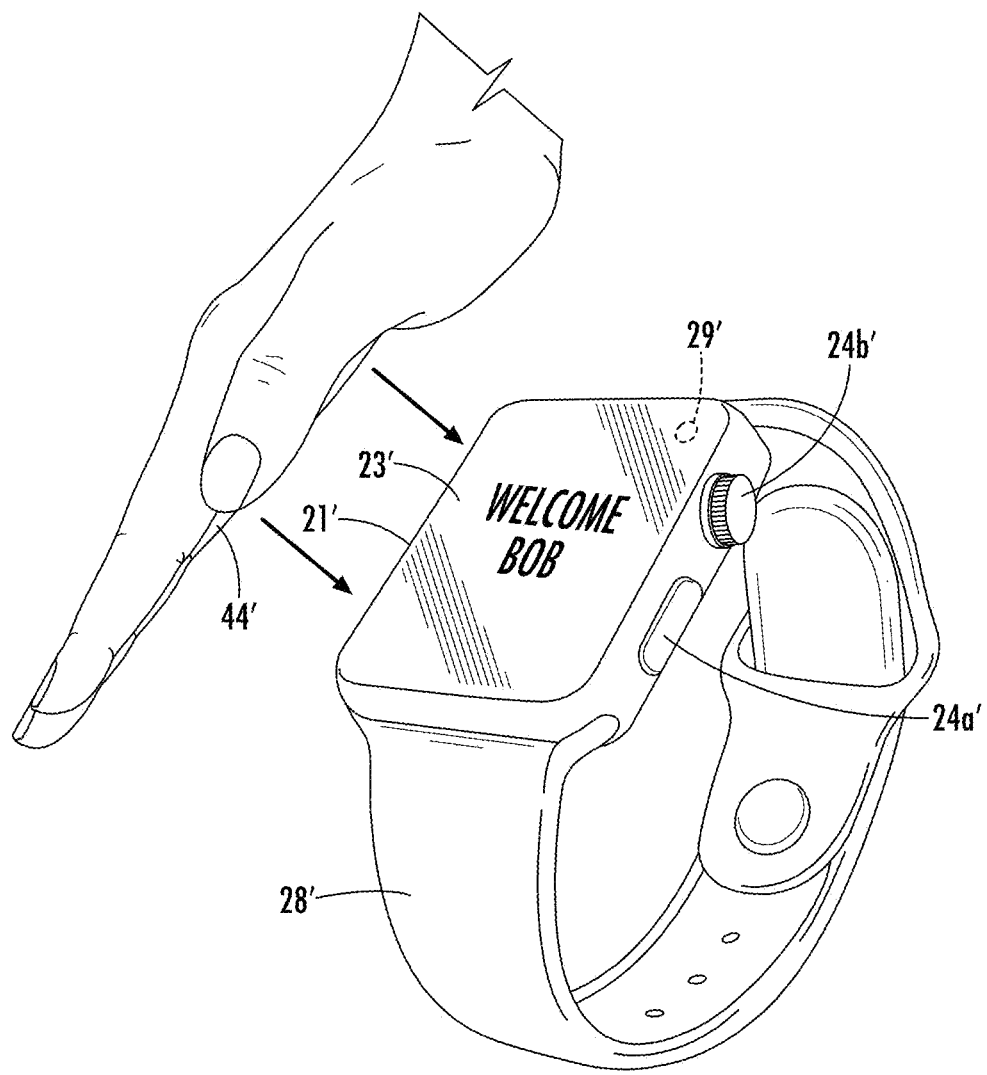
FIG. 10 is a schematic diagram of an electronic device according to another embodiment.
Figure 11:
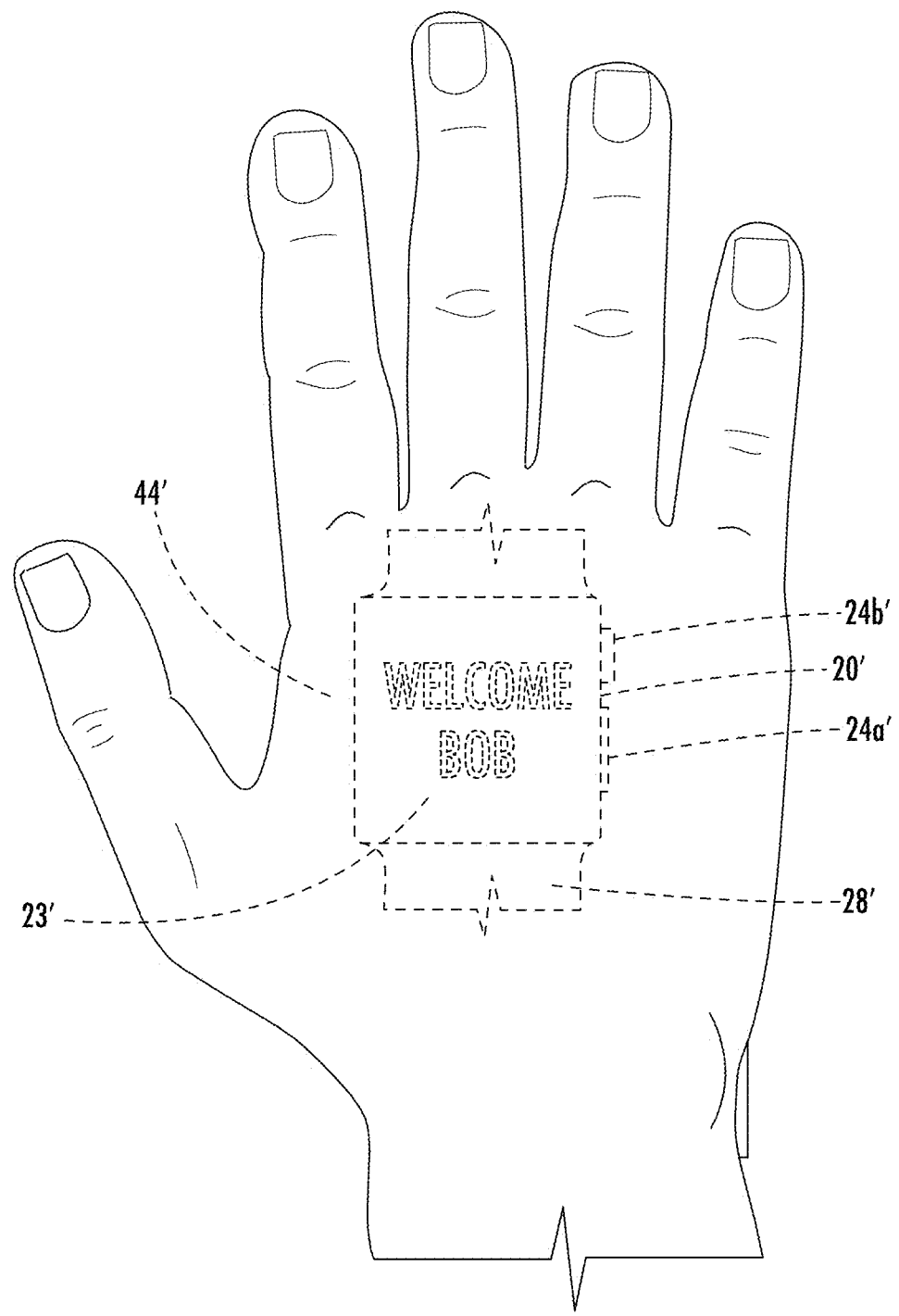
FIG. 11 is another schematic diagram of the electronic device according to an embodiment of FIG. 10.
Figure 12:
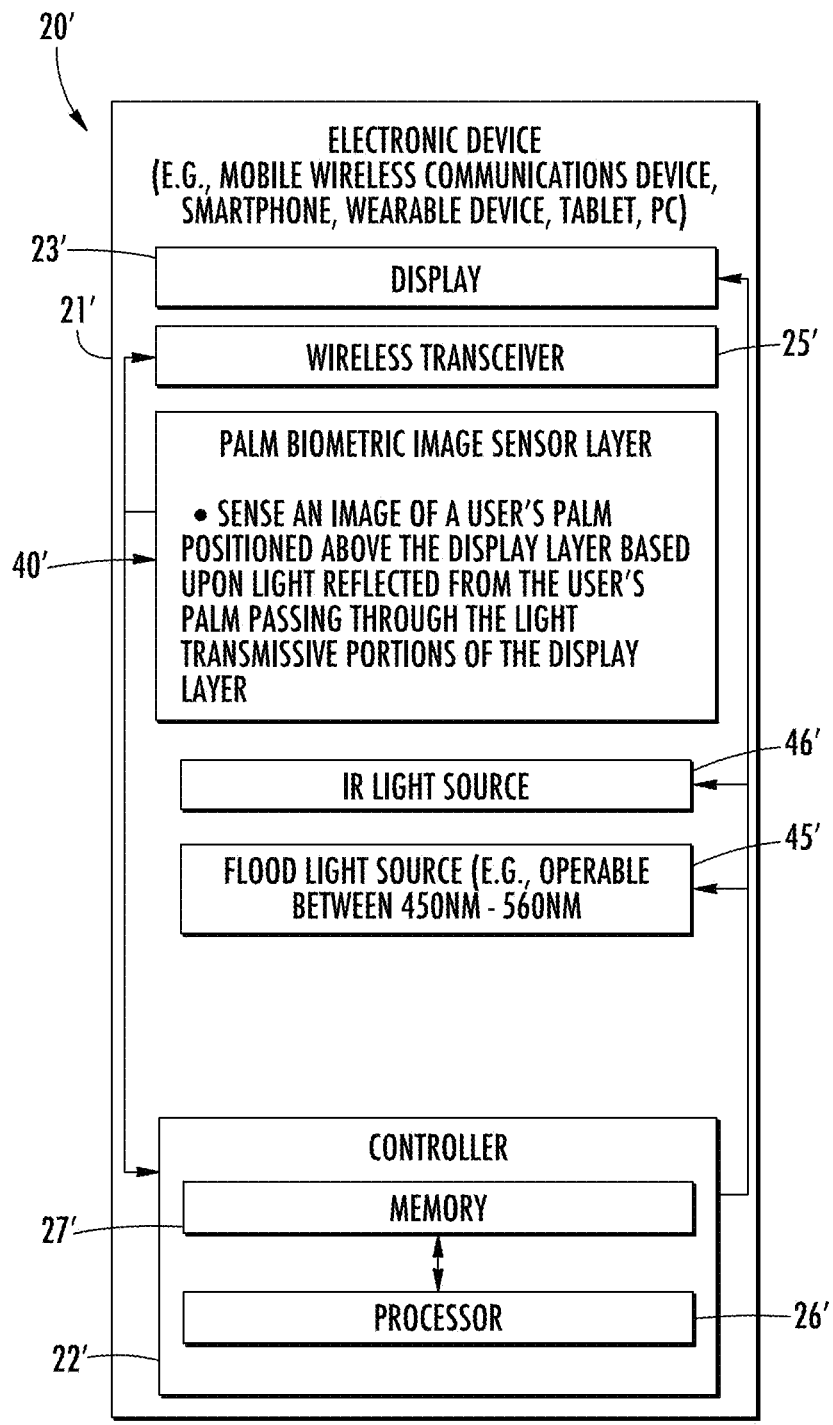
FIG. 12 is a schematic block diagram of the electronic device of FIG. 10.

As will be appreciated by those skilled in the art, subcutaneous vein patterns are generally the dominant features in images of the user's palm taken using at or near infrared wavelengths. FIG. 9 is an image of the user's palm 44 illuminated with near IR light (i.e., 851 nm). The vein patterns can be extracted from those near IR based images, for example, normalized based on the detailed distortion map generated by matching the skin surface cracks, and then biometrically matched to a previously recorded and stored template to generate the match similarity score.

The operations end at Block 82. However, it should be understood by those skilled in the art that the electronic device 20 may repeat the process or steps described above several times as the user's hand is moved above the contactless palm biometric sensor 40 to generate a series of match scores that can be combined and to detect spoof presentations that may not demonstrate the normal random flexing that a live hand would have.

As will be appreciated by those skilled in the art, the components described herein for the contactless palm biometric sensor 40 sensing may also be used for other and/or additional functions. For example, the controller 22 may accept a gesture input based upon movement of the user's palm 44 adjacent the contactless palm biometric sensor 40. The gesture may be separate from or distinct from the authentication operation described above. The controller 22 may perform one or more device operations, such as, for example, application shortcuts, display functions, etc., based upon the accepted gesture. In some embodiments, the controller may accept the gesture input while performing the authentication (i.e., authentication is performing while accepting a gesture). For example, the controller may authenticate the user's palm 44 and open a given application based upon a gesture.

In another example, the controller 22 may perform a facial recognition. More particularly, the controller 22 may selectively operate or cooperate with the IR camera 43, the dot projector 41, the IR light source 46, and/or the flood light source 45, for example, in a series of operations to perform the facial recognition.

Current existing contactless biometric identification systems for user identification may be increasingly inconvenient as, for proper operation, the user is typically required to steadily and accurately hold their hand or fingers in a specific position during the biometric measurement process. This typically produces a rather unpleasant user experience, particularly when the system fails because the user is not able to position their hand steadily and accurately in the specific position. Accordingly, the electronic device 20 described herein may provide increased accuracy palm biometric sensing or authentication by permitting motion or inaccuracies in palm placement.

A method aspect is directed to a method of biometric authentication using a contactless palm biometric sensor 40 that includes at least one light source 45, 46 and at least one light sensor 43 cooperating therewith. The method includes using a controller 22 coupled to the contactless palm biometric sensor 40 to capture image data from a user's palm 44 positioned in spaced relation adjacent the contactless palm biometric sensor and determine an orientation offset of the user's palm based upon the image data. The method also includes using the controller 22 to determine a surface distortion of the user's palm 44 based upon the image data and perform a biometric authentication of the user's palm based upon the image data, the orientation offset, and the surface distortion.

Referring now to FIGS. 10-13, another aspect is directed to an embodiment of an electronic device 20' that illustratively includes a portable housing 21' or device body and a controller 22' carried by the portable housing. The electronic device 20' is illustratively a wearable mobile wireless communications device, for example, a smartwatch, and includes a watchband 28' or strap for securing it to a wrist of a user. The electronic device 20' may be another type of electronic device, for example, a mobile or smartphone, a tablet computer, a laptop computer, etc.

The controller 22' may be in the form of a processor 26' and a memory 27' coupled to the processor. The controller 22' may include other and/or additional circuitry, as will be appreciated by those skilled in the art.

A wireless transceiver 25' (e.g. cellular, WLAN Bluetooth, etc.) is also carried within the portable housing 21' and coupled to the controller 22'. The wireless transceiver 25' cooperates with the controller 22' to perform at least one wireless communications function, for example, for voice and/or data. In some embodiments, the electronic device 20' may not include a wireless transceiver 25'.

A display 23' is also carried by the device housing 21' and is coupled to the controller 22'. The display 23' may be, for example, a liquid crystal display (LCD), light emitting diode (LED) display, or may be another type of display, as will be appreciated by those skilled in the art. The display 23' may be a touch display. The electronic device 20' may function as a wrist-watch, for example, such that the controller 22' cooperates with the display 23' to display a current time. The controller 22' may cooperate with the display 23' to display other types of information, for example, application or communications notifications, movement based data, biometric data, etc.

Finger-operated user input devices 24a', 24b', illustratively in the form of a pushbutton switch and a rotary dial are also carried by the device body or portable housing 21' and are coupled to the processor 22'. The pushbutton switch 24a' and the rotary dial 24b' cooperate with the processor 22' to perform a device function in response to operation thereof. For example, a device function may include a powering on or off of the electronic device 20', initiating communication via the wireless transceiver 25', and/or performing a menu function.

While not specifically illustrated and/or described, similar to the embodiments described above, the electronic device 20' may also include an audio output transducer 28' (i.e., speaker), a proximity sensor 29', a camera 31', an audio input transducer 32', and an ambient light sensor 33' carried by the portable housing 21'.

Figure 14:
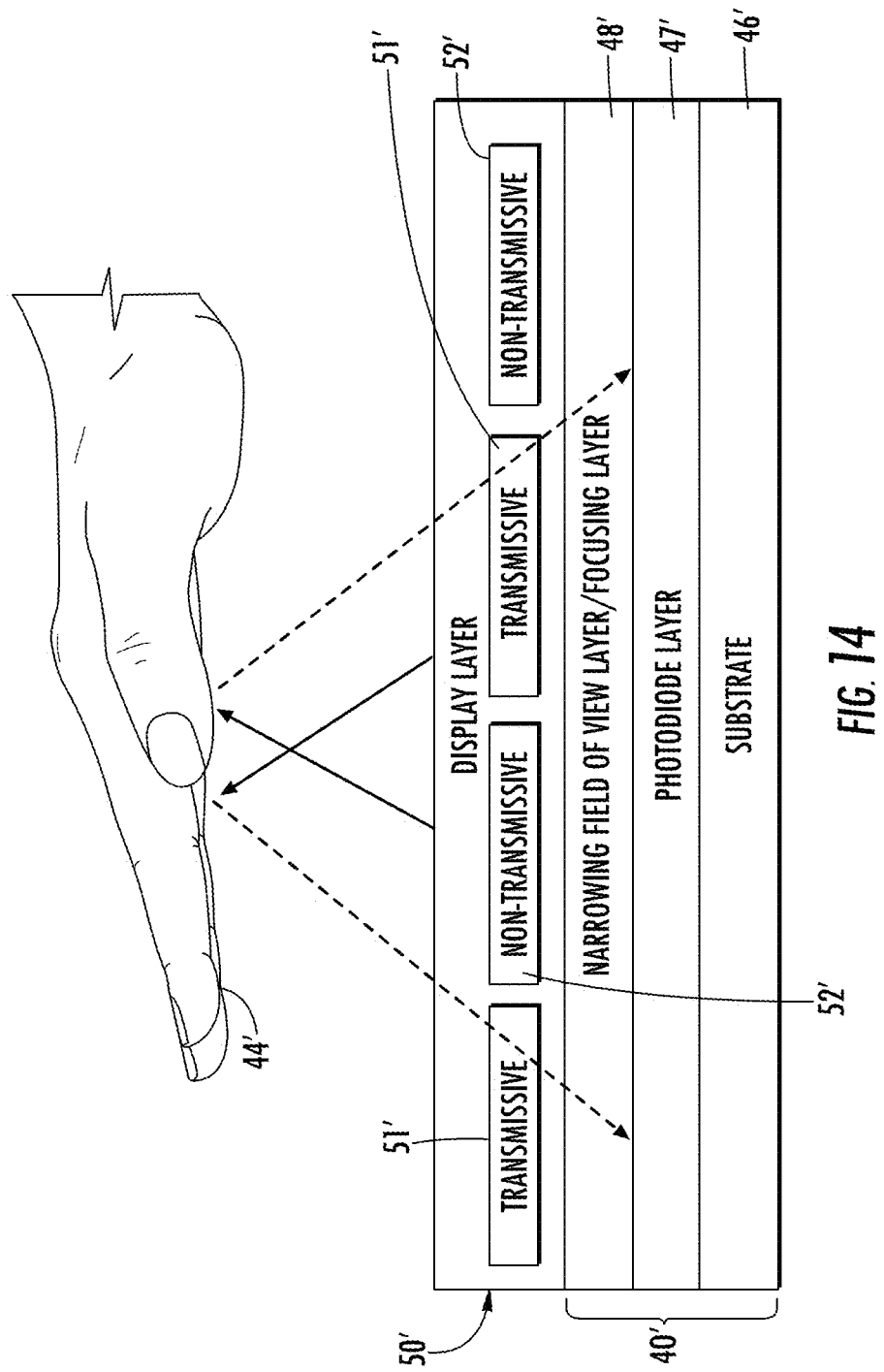
FIG. 14 is a schematic diagram of the display layer and the palm image biometric image sensor layer of the electronic device of FIG. 12.

Referring now additionally to FIG. 14, the display 23' is formed within a display layer 50' that includes light transmissive portions 51' and non-transmissive portions 52'. A palm biometric image sensor layer 40' is beneath the display layer 50'. The palm biometric image sensor layer 40' senses an image of a user's palm 44' positioned above the display layer 50' based upon light reflected from the user's palm passing through the light transmissive portions 51' of the display layer. The palm biometric image sensor layer 40' may sense an image of a user's palm 44' positioned above the display layer 50' regardless of whether the user's palm is spaced from or in contact with the display layer.

The palm biometric image sensor layer 40' includes a substrate 46', a photodiode layer 47' on the substrate, and a narrowing field of view layer or a focusing layer 48' (e.g. including lenses) on the photodiode layer.

Figure 15:
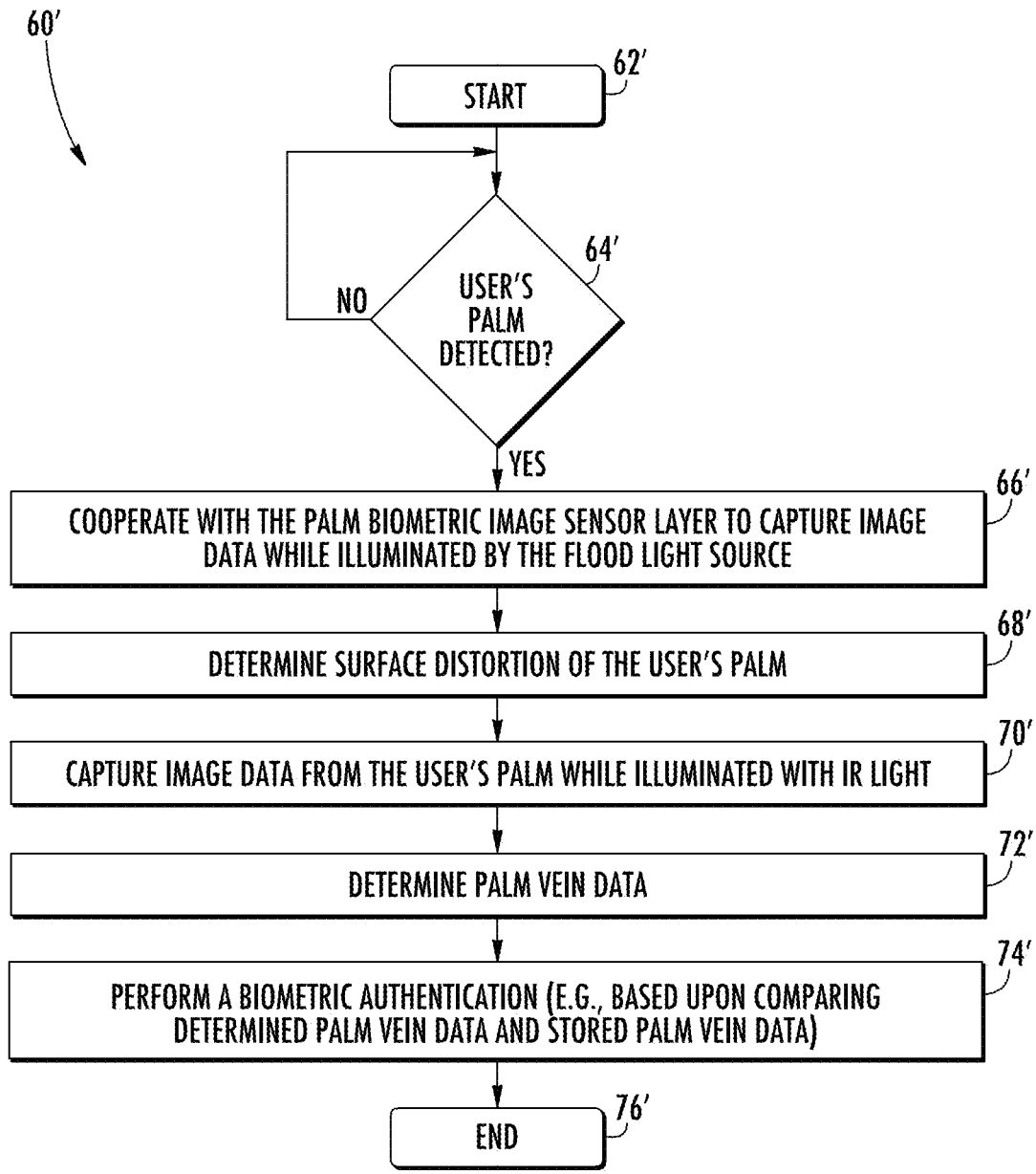
FIG. 15 is a flow diagram according to another embodiment.

Referring now to the flowchart 60' in FIG. 15, beginning at Block 62', operation of the controller 22' with respect to sensing of a palm biometric will now be described. The controller 22', at Block 64', may detect the user's palm 44' being positioned adjacent the palm biometric image sensor layer 40', for example, based upon the proximity sensor 29'. The controller 22' may capture and/or process image data as described below based upon the detection of the user's palm 44' adjacent palm biometric image sensor layer 40'. Other and/or additional sensors (e.g., a camera) may be used to detect the user's palm 44'. If the user's palm 44' is not detected, the controller 22' may poll for detection of the user's palm.

The controller 22' cooperates with the palm biometric image sensor layer 40' to capture image data. The image data may be acquired from the image of the user's palm 44' based upon light reflected from the user's palm through the light transmissive portions 51' of the display layer 50' and the narrowing field of view layer or focusing layer 48' to the photodiode layer 47'. Further details of how the image data is captured will be described below. Those skilled in the art will appreciate that the image data may be captured from the user's palm 44' whether it is in contact with the display layer 50' or spaced from the display layer.

The electronic device 20' also includes a flood light source 45' carried by the portable housing 21'. The flood light source 45' or flood illuminator may include a visible flood light illuminator, for example, and operate in a wavelength between 450 nm and 560 nm (i.e., visible blue-green). In some embodiments, the flood light source 45' may alternatively or additionally include an IR flood light source. Moreover, in some embodiments, the display 23' may alternatively or additionally define the flood light source or an additional flood light source, and may selectively operate pixels. Of course, the flood light source 45' may be used along with other light sources and sensors for use in performing other functions, for example, as described herein. At Block 70', the controller 22' cooperates with the palm biometric image sensor layer 40' to capture image data while illuminated by the flood light source 45'.

The controller 22', at Block 68', determines a surface distortion, for example, palm crease data, of the user's palm 44' based upon the image data resulting from the flood light source 45'. More particularly, the controller 22' determines the surface distortion based upon a comparison between the palm crease data to stored palm crease data, for example, stored in the memory 27'. As will be appreciated by those skilled in the art and as described above, skin surface cracks in the user's palm 44' are the dominant features in images of the user's palm taken using visible wavelengths in the blue and green range.

At Block 74', the controller 22' performs a biometric authentication of the user's palm 44' based upon the image data and the surface distortion. More particularly, an IR light source 46' may be selectively operated, and, by way of the palm biometric image sensor layer 40'', image data of the user's palm 44' illuminated with the IR light while the user's palm is positioned above the display layer 50' may be captured (Block 70'). In some embodiments, the flood light source 45' may be used to illuminate the user's palm 44'. The controller 22' may determine, at Block 72', palm vein data from the image data acquired or resulting from the IR light source 46'. Of course, other and/or additional IR light sources may cooperate and be used as a basis for determining the palm vein data. The controller 22', at Block 74', may perform the biometric authentication based upon a comparison between the determined palm vein data and stored palm vein data, for example, stored in the memory 27'. In some embodiments, the result of the biometric authentication may result in either a non-match determination or a match similarity score and a detailed distortion correction map that generated the match similarity score, for example, as described above.

A method aspect is directed to a method of biometric authentication using a palm biometric image sensor layer 40' beneath a display layer 50' that includes light transmissive 51' and non-transmissive portions 52' and configured to sense an image of a user's palm 44' positioned above the display layer based upon light reflected from the user's palm passing through the light transmissive portions of the display layer. The method includes using a controller 22' coupled to the palm biometric image sensor layer 40' to capture image data from the user's palm 44' and determine a surface distortion of the user's palm based upon the image data. The method may also include using the controller 22' to perform a biometric authentication of the user's palm based upon the image data and the surface distortion.

While elements are described herein with respect to multiple embodiments it should be understood by those skilled in the art the any element from any embodiment may be used with one or more elements from one or more other embodiments. Additionally, a single element may perform functions of multiple elements.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data, and further contemplates user restrictions on storing data in cloud-based services and/or restricting access to the same. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a display layer comprising light transmissive portions and non-transmissive portions;
   at least one light source comprising a dot projector configured to project a plurality of dot images on a surface of a user's palm;
   a palm biometric image sensor layer beneath the display layer and configured to sense an image of the user's palm spaced above the display layer based upon light reflected from the user's palm passing through the light transmissive portions of the display layer; and
   a controller configured to
      capture image data from the user's palm in cooperation with the palm biometric image sensor layer,
      determine an orientation offset of the user's palm based upon distortion of the plurality of dot images from the image data,
      determine a surface distortion of the user's palm based upon matching palm crease data of the user's palm extracted from the image data,
      determine palm vein data from the image data by extracting vein patterns of the user's palm based upon the matching palm crease data, and
      perform a biometric authentication of the user's palm based upon comparing the palm vein data to stored palm vein data, correction of the image data for the orientation offset, and the surface distortion.

2. The electronic device of claim 1 wherein the palm biometric image sensing layer comprises:
   a substrate;
   a photodiode layer on the substrate; and
   a narrowing field of view layer above the photodiode layer.

3. The electronic device of claim 1 wherein the palm biometric image sensing layer comprises:
   a substrate;
   a photodiode layer on the substrate; and
   a focusing layer above the photodiode layer.

4. The electronic device of claim 1 wherein the at least one light source comprises at least one infrared light source; and wherein the controller is configured to determine the palm vein data based upon the at least one infrared light source.

5. The electronic device of claim 1 comprising a flood light source; and wherein the controller is configured to determine the palm crease data based upon the flood light source.

6. The electronic device of claim 5 wherein the flood light source comprises a flood light source operable at a wavelength between 450 nm to 560 nm.

7. The electronic device of claim 1 wherein the controller is configured to detect the user's palm being positioned adjacent the palm biometric image sensor layer and capture the image data based thereon.

8. The electronic device of claim 1 comprising:
   a portable housing carrying the display layer, palm biometric image sensor layer, and controller; and
   a wireless transceiver carried by the portable housing and coupled to the controller.

9. The electronic device of claim 8 further comprising a watchband carried by the portable housing.

10. The electronic device of claim 1 wherein the controller comprises a processor and a memory coupled thereto.

11. An electronic device comprising:
    a portable housing;
    a wireless transceiver carried by the portable housing;
    a display layer carried by the portable housing and comprising light transmissive portions and non-transmissive portions;
    at least one light source comprising a dot projector configured to project a plurality of dot images on a surface of a user's palm;
    a palm biometric image sensor layer carried by the portable housing beneath the display layer and configured to sense an image of the user's palm spaced above the display layer based upon light reflected from the user's palm passing through the light transmissive portions of the display layer, the palm biometric image sensor layer comprising a substrate, a photodiode layer on the substrate, and a narrowing field of view layer on the photodiode layer; and
    a controller carried by the portable housing and configured to
       capture image data from the user's palm in cooperation with the palm biometric image sensor layer,
       determine an orientation offset of the user's palm based upon distortion of the plurality of dot images from the image data,
       determine a surface distortion of the user's palm based upon matching palm crease data of the user's palm extracted from the image data,
       determine palm vein data from the image data by extracting vein patterns of the user's palm based upon the matching palm crease data, and
       perform a biometric authentication of the user's palm based upon comparing the palm vein data to the stored palm vein data, correction of the image data for the orientation offset, and the surface distortion.

12. The electronic device of claim 11 wherein the at least one light source comprises at least one infrared light source;

and wherein the controller is configured to determine the palm vein data based upon the at least one infrared light source.

13. The electronic device of claim 11 comprising a flood light source; and wherein the controller is configured to determine the palm crease data based upon the flood light source.

14. The electronic device of claim 11 wherein the controller is configured to detect the user's palm being positioned adjacent the palm biometric image sensor layer and capture the image data based thereon.

15. A method of biometric authentication using a palm biometric image sensor adjacent a display layer and configured to sense an image of a user's palm spaced above the display layer based upon light reflected from the user's palm passing through the display layer, the method comprising:
using a controller coupled to the palm biometric image sensor layer to
capture image data from the user's palm,
determine an orientation offset of the user's palm based upon distortion of the plurality of dot images from the image data, the plurality of dot images projected on a surface of the user's palm by a dot projector of at least one light source,
determine a surface distortion of the user's palm based upon matching palm crease data of the user's palm extracted from the image data,
determine palm vein data from the image data by extracting vein patterns of the user's palm based upon the matching palm crease data, and
perform a biometric authentication of the user's palm based upon comparing the palm vein data to stored palm vein data, correction of the image data for the orientation offset, and the surface distortion.

16. The method of claim 15 wherein the display layer comprises light transmissive portions and non-transmissive portions, wherein the palm biometric image sensor layer is beneath the display layer and configured to sense the image of a user's palm positioned based upon light reflected from the user's palm passing through the light transmissive portions of the display layer.

17. The method of claim 15 wherein the palm biometric image sensing layer comprises:
a substrate;
a photodiode layer on the substrate; and
a narrowing field of view layer above the photodiode layer.

18. The method of claim 15 wherein the palm biometric image sensing layer comprises a substrate, a photodiode layer on the substrate, and a focusing layer above the photodiode layer.

* * * * *